April 2, 1968 W. V. MYER 3,376,010
FORMING APPARATUS
Filed May 11, 1965 7 Sheets-Sheet 3

Wilbur V. Myer
INVENTOR.

BY *Clarence A. O'Brien*
*and Harvey B. Jacobson*
Attorneys

April 2, 1968

W. V. MYER 3,376,010

FORMING APPARATUS

Filed May 11, 1965

Wilbur V. Myer
INVENTOR.

BY *Clarence A. O'Brien*
*and Harvey B. Jacobson*
Attorneys

Wilbur V. Myer
INVENTOR.

April 2, 1968 W. V. MYER 3,376,010
FORMING APPARATUS

Filed May 11, 1965 7 Sheets-Sheet 6

Wilbur V. Myer
INVENTOR.

BY Clarence A. O'Brien
and Harvey B. Jacobson
Attorneys

April 2, 1968  W. V. MYER  3,376,010
FORMING APPARATUS
Filed May 11, 1965  7 Sheets-Sheet 7

Wilbur V. Myer
INVENTOR.

United States Patent Office 3,376,010
Patented Apr. 2, 1968

3,376,010
FORMING APPARATUS
Wilbur V. Myer, Rte. 4, c/o Bolton,
Sallisaw, Okla. 74955
Filed May 11, 1965, Ser. No. 454,950
19 Claims. (Cl. 249—13)

ABSTRACT OF THE DISCLOSURE

Apparatus for forming poured concrete walls including a horizontal casting table and form boards in wall defining relationship thereabout. A plurality of adjustable clamping units overlie the casting table and engage the top and foot form boards for retaining the position thereof. An adjustable shoulder form is mounted on the clamping units so as to define, in conjunction with an offset in the casting table, the opposed footing shoulders from which the wall itself extends.

---

The present invention is generally concerned with adjustable forming apparatus, and more particularly with forming apparatus specifically adapted for use in forming enlarged precast concrete walls on horizontal casting beds, the walls, subsequent to the setting thereof, to be tilted up into a vertical erected position.

A highly significant object of the instant invention is to provide adjustable forming apparatus which is unique in its adaptability to form, as a unit, both the wall itself and the enlarged footing integral therewith.

In conjunction with the above object, it is also a significant object of the instant invention to provide a forming apparatus which can be utilized in the formation of both exterior and interior walls.

Further, it is a significant object of the instant invention to provide forming apparatus capable of integrally forming, at the pouring stage, the various joining edges for complementary engagement with adjacent walls upon an erection thereof.

Another significant object of the instant invention is to provide forming apparatus which can be quickly assembled and erected at the site of the pour, and can just as easily be disassembled and removed from the cast wall subsequent to an initial setting thereof.

In conjunction with the above object, it is also an object of the instant invention to provide forming apparatus which is relatively simple in construction and capable of being substantially completely disassembled, while at the same time providing, in its erected position, a highly stable form construction capable of easily withstanding the loads to which it will normally be subjected both by the introduction of the poured concrete and by the working or vibrating of the concrete as needed.

Likewise, it is an object of the instant invention to provide forming apparatus incorporating self-squaring sheet metal plates both as the pouring deck and as means for properly aligning the form walls.

Also, it is an object of the instant invention to provide a forming apparatus which incorporates top, bottom and side form boards specifically braced so as to retain the desired planar shape thereof and properly form the wall edges.

Further, it is an object of the instant invention to provide an adjustable shoulder form wherein the height of the upper or inner footing shoulder can be formed where desired.

In addition, it is an object of the instant invention to provide for the positioning of reinforcing within the apparatus, the heavy reinforcing for the outer wall portion being mounted, through end sockets, on the form boards, the lighter reinforcing for the inner wall portion being supported by series of stirrups embedded within the outer wall portion and projecting therefrom.

In conjunction with the above object, it is also a significant object of the instant invention to provide for a novel stirrup supporting and positioning device removably mounted on the forming apparatus and releasably suspending the stirrups therefrom.

Furthermore, it is an object of the instant invention to provide, in the forming apparatus, a plurality of enlarged clamping units which engage and clampingly position the top and foot form boards, these clamping units extending across and substantially above the casting table so as to allow sufficient room for the working of the poured material.

Basically, the forming apparatus of the instant invention includes, in conjunction with a flat casting floor or table having a downstepped offset along one edge thereof, top and foot form boards, a pair of side form boards, and enlarged clamping units engaging the outer faces of the top and foot form boards and properly positioning these form boards with the spaced side boards clamped therebetween. The foot form board is to be positioned within the step down portion of the casting table in spaced relation to the offset with the top form board being located, generally parallel to the foot form board, on the upper portion of the casting floor spaced from the offset a distance corresponding to the overall height of the wall. The foot board projects vertically above the plane of the top edge of the top board so as to form, in conjunction with an adjustable shoulder form, an enlarged footing integral with the wall formed on the major upper portion of the casting table along with inner and outer shoulders therebetween formed by the adjustable shoulder form and the offset in the casting table, which is incidently reinforced by a lower rigid shoulder form. The side boards are of two general types, the side boards for forming exterior walls inclined at a 45° angle to the perpendicular, and the side boards for forming interior walls orientated perpendicularly. The exterior side boards, in addition to longitudinally extending edge rigidifying members and transversely extending bracing plates, also include, along the inner face thereof, recess forming members utilized in bolting the erected corners of the building together through suitable corner angles. The main clamping units include a vertical base arm and a vertical top arm interconnected by elongated telescopic tubular members extending transversely across the casting table and selectively clampable in any telescopically adjusted position so as to operatively engage the base and top arms against the outer faces of the foot and top form boards, this engagement being effected with both the upper and lower edges of the corresponding form boards so as to insure the vertical orientation and stable positioning of these boards. In addition, the telescopic member extending from the base arm includes upper or inner shoulder forming means slidingly mounted thereon and positionable along the length thereof so as to properly orientate the inner shoulder form. Further, while the heavy reinforcing rods for the outer wall portion are supported either directly from bolted engagement with the form boards, or by other suitable natural or artificial rod supports which are to subsequently be embedded within the concrete, the reinforcing wires or mesh for the inner wall portion are supported on a plurality of stirrups embedded within the outer wall portion and projecting thereabove. The positioning of the stirrups is achieved through an elongated stirrup supporting and positioning device which is suspended transversely across the casting table and releasably engages each stirrup in a manner so as to suspend the stirrup during the pouring of the outer wall portion, the supporting device, upon a slight setting of the outer wall portion, being disengaged from the stirrups and removed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now more specifically to the drawings, it should first be noted that the forming apparatus of the instant invention is to be used in conjunction with a horizontal casting bed or floor 30, this casting floor 30 being formed of smooth sand, plate steel, etc., with plate steel being preferred both for consistency and the elimination of the need to smooth the bed after each pour. The casting table or bed 30 includes, along the bottom or foot edge thereof, an offset 32, normally on the order of 4 inches, with the lower offset portion of the bed enabling an integral forming of an enlarged footing 34 in conjunction with the main portion 36 of the wall.

The forming apparatus itself includes an elongated outer or lower shoulder pan or form 38 conforming to the offset 32 and overlying the adjacent edges of the upper and lower portions of the casting floor 30, thereby reinforcing this portion of the casting floor so as to provide true corners, this being particularly significant when utilizing a sand casting floor. Spaced laterally from the lower shoulder pan 38, within the offset portion of the casting floor, is an elongated parallel vertically orientated foot or base form board 40. This form board 40, of any suitable rigid material such as wood or steel, includes, along both the upper and lower edges thereof, stiffening angles 42, welded, bolted, or otherwise permanently affixed to the outer face of the form board 40 with one leg parallel to and juxtaposed the outer face and with the other leg projecting perpendicularly outward therefrom in the plane of the corresponding edge. A second similarly formed top or upper form board 44 is located on the upper portion of the casting table 30 in laterally spaced parallel relation to the footing board 40 at a distance corresponding to the desired finished height of the wall to be poured. This top form board 44 also includes the rigidifying or stiffening angle members 46 secured to the upper and lower edges thereof.

The relative positions of the foot and top form boards 40 and 44 are fixed by a plurality of longitudinally spaced transversely extending clamping units 48. Each of the clamping units 48 includes a vertical base arm 50 and a vertical top arm 52, these arms preferably being of rectangular or square tubing. The base arm 50 is engaged against the outer face of the foot board 40, and more specifically against the outer edges of the horizontally projecting legs of the stiffening angles 42. In turn, the foot board 40 is positioned relative to the outer shoulder forming pan or form 38 by a plurality of longitudinally spaced rigid straps or bars 54 bolted to the undersurface of the lower leg of the pan 38 and projecting outwardly therefrom a distance corresponding to the depth of the footing 34, each rigid bar 54 having a stop 56 fixed to the outer end thereof, the inner face of the foot board 40 adjacent the lower edge thereof being abutted against this stop 56 and thereby orientated properly. Depending from the undersurface of the bar 54 adjacent the outer end thereof, and rigidly fixed thereto, is a short headed stub 58 to which an elongated rigid strap 60 is releasably secured through an elongated slot 62 in the side thereof which receives the stem portion of the stop 58. The strap 60, in its operative position, projects longitudinally outward from the bar 54 and terminates in a vertically extending flange 64 which in turn forms an abutment against which oppositely extending triangular wedges 66 can be forced for wedging the lower end of the base arm 50 tightly against the lower edge of the form board 40 which in turn is thus clamped against the corresponding stop 56. This slotted easily disengageable connection of the strap 60 with the bar 54 is particularly significant in that it enables the removal and salvaging of this strap prior to a tilting up of the precast wall. Incidently, as will be better appreciated following the detailed description of the invention, all portions of the forming apparatus are salvaged and capable of being re-used. Referring again specifically to the extension strap 60, it will be appreciated that once the initial set has taken place, the wedges 66 can be released and the strap 64 pivoted or slid sideways and subsequently removed, along with the foot form 40 and base arm 50.

Figures 5, 6, 7:
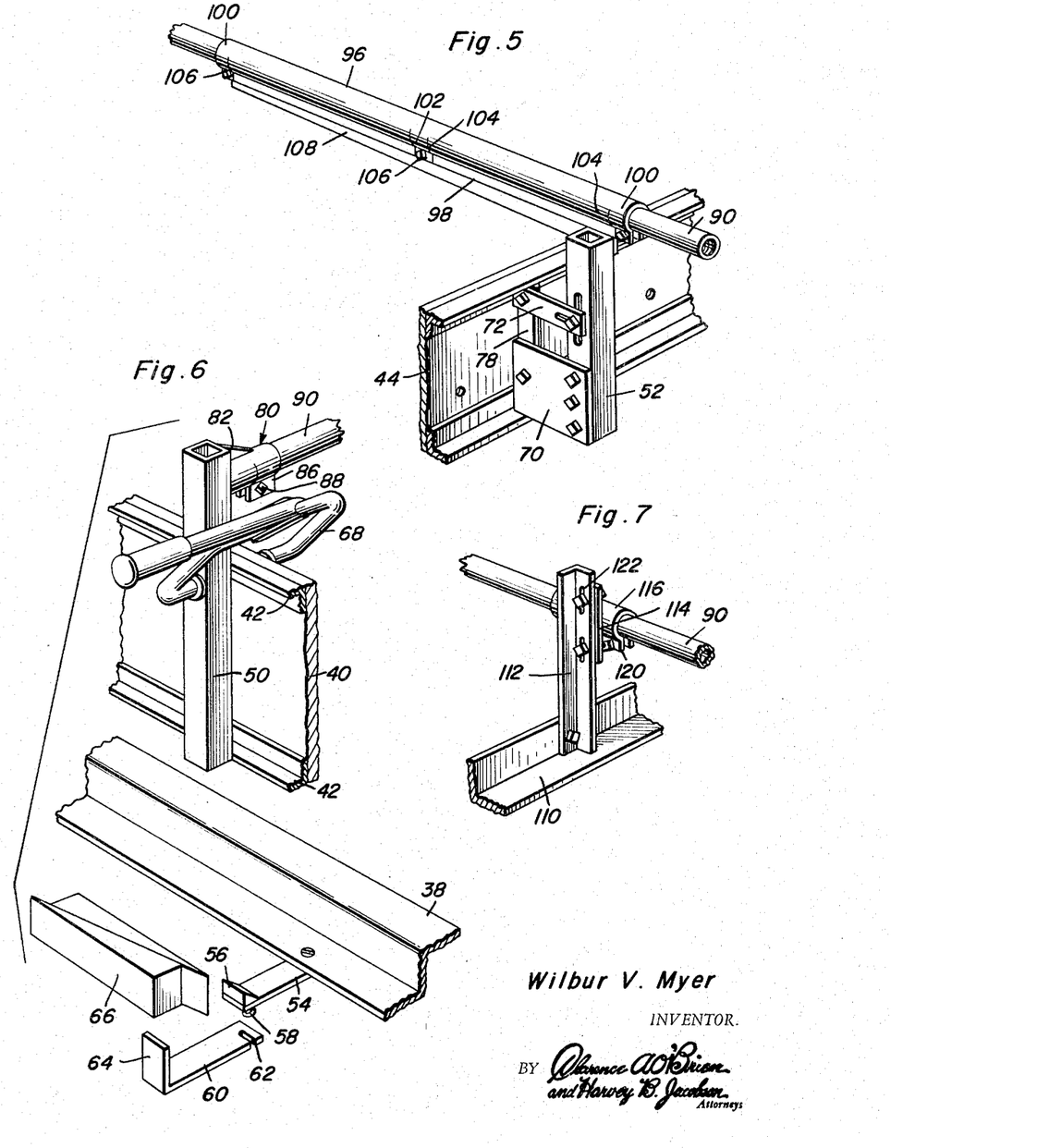
FIGURE 5 is a perspective detail of the top end of the clamping unit and the adjacent top form board.
FIGURE 6 is an exploded perspective detail of the bottom or foot end of the clamping unit and the elements utilized in securing the foot form board thereto.
FIGURE 7 is a perspective detail of the inner adjustable shoulder form and adjustable mounting means therefor.

The upper edge portion of the foot form 40 is to also be clamped to base arm 50, this being done by a conventional C-clamp or quick release clamp 68 in the manner illustrated in FIGURE 6.

The top arm 52 is engaged against the outer face of the top form 44, and more specifically against the outer faces of the vertical legs of the stiffening angles 46, by an enlarged plate 70 bolted to the lower portion of the arm 52 and extending into abutting engagement with the top board 44, and an elongated rigid strap 72 fixed to the top arm 52 and abutted against the top form board 44 adjacent the upper edge thereof, the strap 72 being bolted to the top arm 52 through a vertically elongated slot 74 in the arm 52 and a horizontally elongated slot 76 in the strap 72, thereby allowing for an adjustment of this upper strap so as to insure the completely vertical orientation of the top form 44. Further, if so desired, the free ends of the plate 70 and strap 72 can be interconnected by a vertically extending strap or angle 78 extending therebetween and bolted thereto.

The upper end of the rectangular base arm is provided with an inwardly projecting tubular socket 80 rigidly welded thereto with gusset plates 82 being provided for additional stability. The inner end portion 84 of the socket 80 is longitudinally slit along the bottom thereof so as to provide two spaced edges, these edges having depending integral parallel laterally spaced flanges 86 which receive a clamping bolt and nut means 88 therethrough so as to enable a selective restricting of the inner end portion of the socket 80 for the clamping of an elongated tubular rod 90 therein. Incidently, the clamping movement of the inner end portion 84 is facilitated by arcuate slits 92 extending a short distance about the periphery of the socket 80 adjacent the inner end portion 84 and terminating at the inner end of the longitudinal slot. The elongated hollow tubular rod 90, which may be internally braced by a diametrically extending plate 94, projects transversely completely across the forming apparatus and is telescopically received within an elongated longitudinally split tubular sleeve 96. The edges defining the full length slot in the hollow tubular sleeve 96 are provided with integral outwardly projecting parallel laterally spaced rigidifying flanges 98 with both end portions 100 of the sleeve 96, as well as selected intermediate portions 102 therealong, acting in the manner of circumferential clamps for engagement with the rod 90, these clamping portions 100 and 102 being defined by arcuate slits 104 which enable a flexing thereof relative to the remainder of the sleeve 96, this flexing into clamping engagement of course being effected by nutted bolts 106. Additional rigidity is introduced into the elongated sleeve 96 by means of a flat bar 108 welded to one of the depending flanges 98 along substantially the full length thereof, this bar 108 being suitably notched in the vicinity of the intermediate clamping portions 102 so as not to interfere with the clamping action desired. It is through this rigidifying bar 108 that the sleeve 96 is rigidly affixed to the upper end of the tubular top arm 52, as by welding. Likewise, it is through the telescoping members 90 and 96 that the lateral spacing between the arms 50 and 52, and consequently the foot and top form boards 40 and 44 is set and maintained. Incidently, the top end of the rod 90 can be internally threaded so as to accommodate an extension, if desired, to form a wall of greater height. Further, inasmuch as the sleeve 96 can be rotated on the rod 90, the top arm 52 can be quickly aligned so as to project perpendicularly across the top edge of the wall to be formed. This is most significant when forming curved or corrugated walls in that the arm 52 can be angled relative to the vertical so as to project perpendicularly across any particular portion of the curve of the wall.

In order to form an inner or upper shoulder between the footing 34 and the wall portion 36, corresponding to the outer or lower shoulder formed by the shoulder pan 38, a shoulder form or pan 110 is suspended from the rod members 90 of the plurality of clamping units 48 along the full length of the wall. The inner shoulder form 110 consists of a right angular member orientated with one leg vertical and parallel to the foot board 40 and the second leg horizontal and parallel to the upper casting table portion. A vertically elongated angle bar 112 is removably fixed, by bolting, to the upper surface of the horizontal leg of the form 110 and projects vertically thereabove for bolted engagement with a plate 114 welded to one side of a cylindrical longitudinally split collar 116 slidably received over the rod 90 and selectively clamped thereto by clamping bolts 118 extending through a pair of depending flanges 120. The vertical position of the form 110 can be adjusted through the provision of elongated slots 122 in the hanging bar 112. Further, if deemed desirable, a duplicate suspension arrangement can be provided on the other side of each of the rods 90, this being best seen in FIGURE 3. Also, while the inner shoulder form 110 has been illustrated in parallel alignment with the outer shoulder form 38, it will be appreciated that the inner shoulder can be formed either above or below the outer shoulder as desired, depending upon the level desired for the finished floor within the building ultimately constructed from the precast walls. Once the inner shoulder form or pan 110 is located, spacers 124 are provided between the shoulder form 110 and the base form board 40, between the clamping units 48, so as to assist in maintaining this spacing along the full length of the wall. The spacers 124 consist of a rigid elongated bar or angle member 126 having depending lugs 128 thereon, the lugs 128 being arranged in pairs, one pair snugly receiving the opposite sides of the vertical leg of the form 110 and the other pair snugly receiving the upper end of the base form board 40 including the stiffening angle 42 thereon.

The above-described apparatus is equally adaptable for use in forming both exterior walls and interior walls by merely utilizing different height foot and top form boards 40 and 44, the remainder of the apparatus being adjustable as needed. Along these lines, the arms 50 and 52 can be operatively lengthened through the use of extensions adjustably telescoped therein and selectively projectable from the bottom of each arm.

Figures 8, 15:
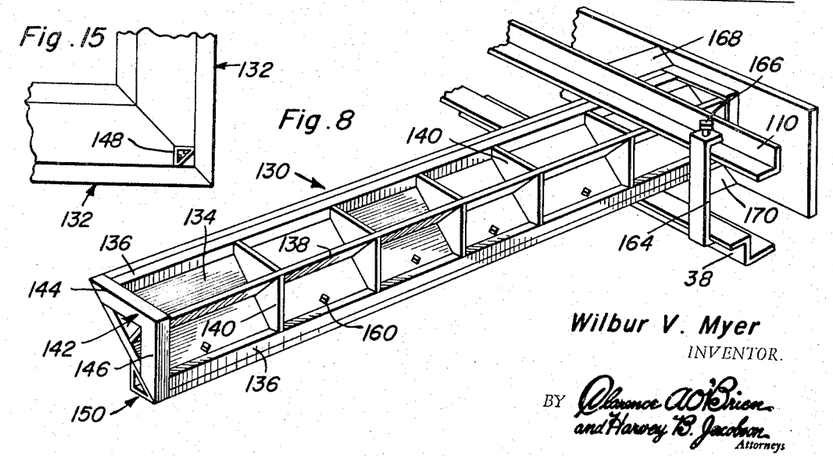
FIGURE 8 is a perspective view of an exterior side form board illustrating its manner of engagement with the footing forming portion of the apparatus.
FIGURE 15 is an enlarged view of an exterior corner illustrating the 45° angle of the abutting side edges and the notches formed therein for the reception of a locking angle.
Figure 12:
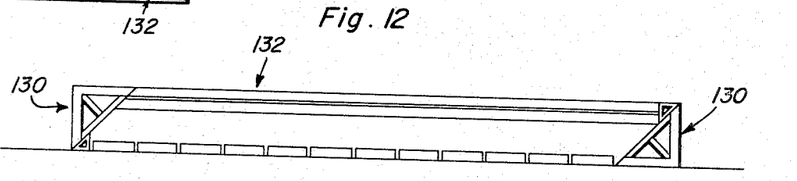
FIGURES 12 and 13 schematically illustrate the manner in which the orientation of the side form boards can be varied so as to form either inside or outside corners.
Figure 13:
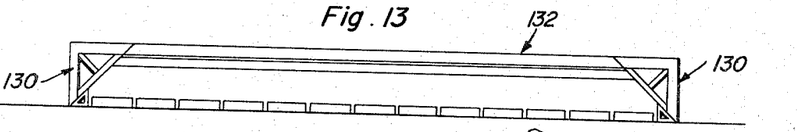
Figure 14:
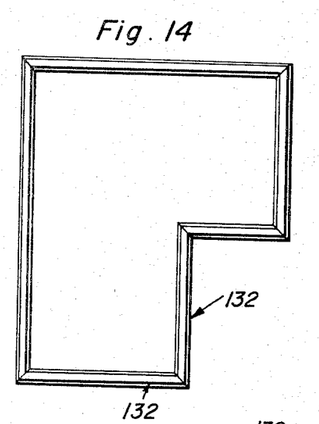
FIGURE 14 is a schematic floor plan of a building having both inside and outside corners constructed in the manner suggested in FIGURES 12 and 13.
Figure 16:
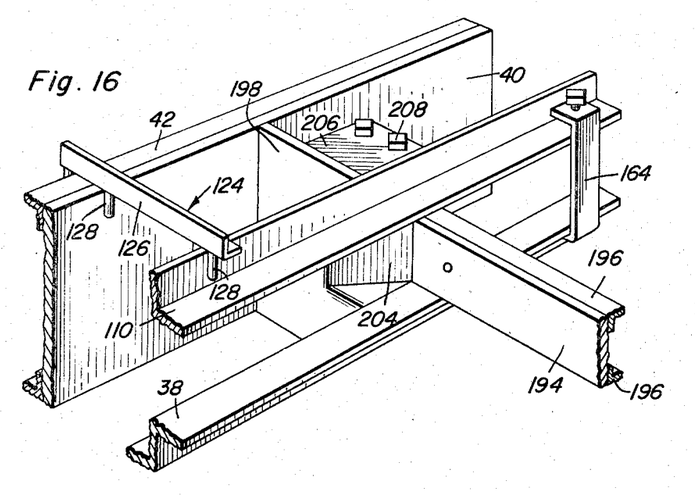
FIGURE 16 is a perspective detail of the construction at the footing end of the forming apparatus when utilized in the formation of interior walls.
Figure 17:
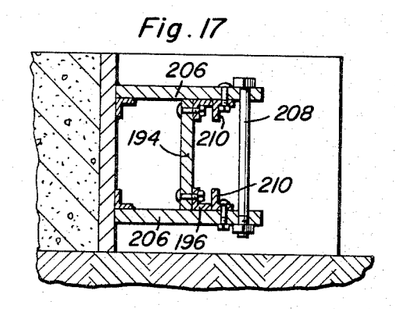
FIGURE 17 is a cross sectional view through the interior side form board within the footing forming portion illustrating the manner in which this side form board is to be clamped into position.
Figure 18:
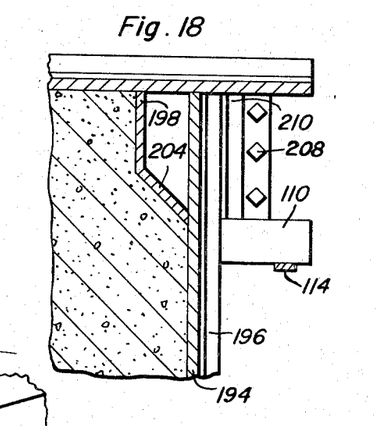
FIGURE 18 is a partial horizontal cross sectional view through the same portion of the apparatus illustrating the insert utilized in providing an angled transition face between the outer edge of the wall and the inwardly offset outer edge of the interior wall footing for engagement with a complementarily formed inner face of an exterior wall.
Figure 19:
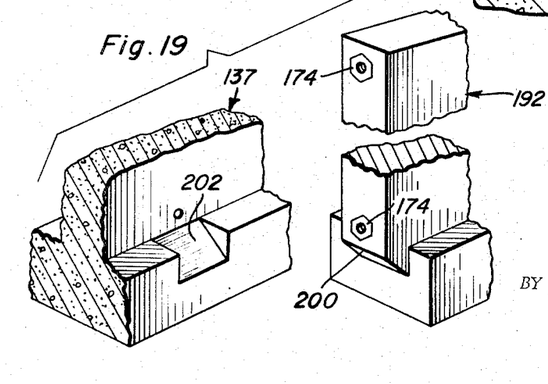
FIGURE 19 is an exploded perspective view illustrating the side edge of the interior wall utilizing the specific insert shown in FIGURES 16 and 18, along with the portion of the exterior wall to receive the edge of the interior wall.

In forming the side edges of an exterior wall, a specifically constructed side form 130 is utilized. The edge of the exterior wall, generally indicated by reference numeral 132 in FIGURES 14 and 15, is to be angled at approximately 45° for abutment against a similarly angled edge of a second wall orientated perpendicularly thereto, this type of engagement between the wall edges being particularly desirable in that an alignment of the walls is facilitated as they are tilted up into position. FIGURES 12 and 13 illustate the various positions which may be assumed by the side forms 130 depending on whether exterior or interior corners are being formed, the schematic plan view of FIGURE 14 illustrating both types of corners.

Figures 3, 9:
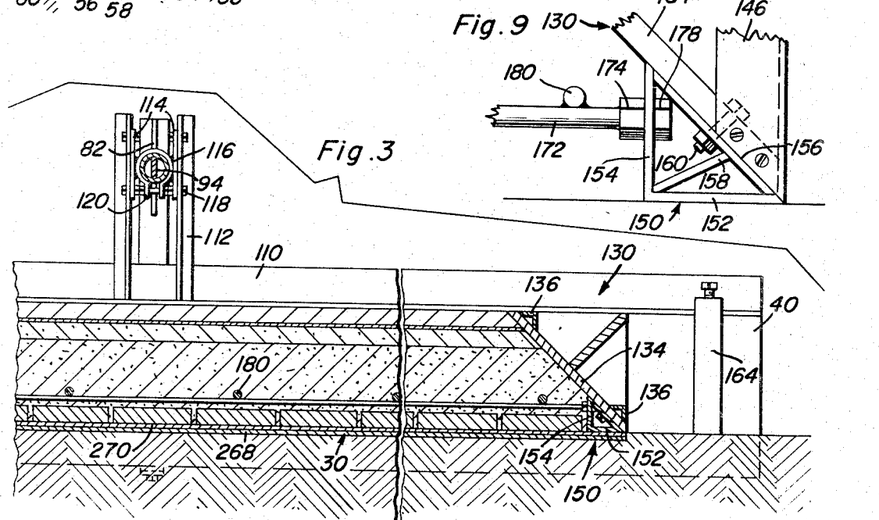
FIGURE 3 is an enlarged partial cross sectional view taken substantially on a plane passing along line 3—3 in FIGURE 1.
FIGURE 9 is a detailed view of a portion of the side form board illustrating the notch forming member and the manner in which the socket ends of the reinforcing rods are tied thereto.

The side form 130 includes an elongated form board 134 orientated at a 45° angle and rigidified, along the longitudinal edges thereof, by angle members 136 fixed to the rear face thereof. Referring to FIGURE 3, it will be noted that the upper stiffener 136 has a first upper leg orientated horizontally in the plane of the horizontal upper edge of the side form board 134 and a right angular leg depending from the horizontal leg into engagement with the rear face of the board 134 below the upper edge. The lower angle stiffener 136 includes a vertical leg coplanar with the vertical lower edge of the board 134, and a horizontal leg projecting perpendicularly from the vertical leg into engagement with the rear face of the board 134 above the lower edge. Additional rigidity is introduced into the side from board 134 by a longitudinally extending centrally located back rib or bracing plate 138, and a plurality of right angular transversely extending cross braces or bracing plates 140. These cross braces 140 have one edge thereof engaged flat against the rear surface of the board 134 with the opposite ends thereof engaged with the vertical leg of the upper stiffener 136 and the horizontal leg of the lower stiffener 136, the cross braces 140 also including a horizontal edge coplanar with the horizontal top edge of the board 134 and a vertical edge vertically aligned with the vertical lower edge of the board 134. The opposite ends of the side form 130 include end members 142 consisting of a horizontally orientated angle portion 144 and a vertically orientated angle portion 146. These portions 144 and 146 are integrally connected at their meeting ends with the free end of the portion 144 being fixed to both the horizontal upper edge of the board 134 and the end edge of the board 134 while the free end of the vertical portion 146 is fixed to the lower vertical edge of the board 134 and the end edge of the board 134.

Figure 10:
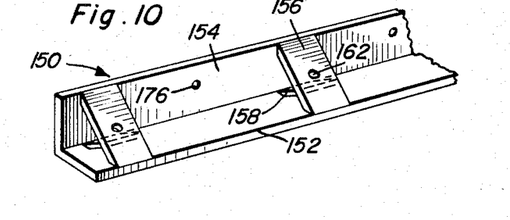
FIGURE 10 is a perspective view of the inner side of the notch forming member shown in FIGURE 9.

The inner or forming face or surface of the board 134 is smooth and substantially uninterrupted for the full length thereof so as to provide a properly mateable 45° side edge on the exterior building wall 132. One preferred manner of interconnecting the adjacent walls, at the corner formed therebetween, is by means of a vertically extending angle member 148 received within a right angular notch at the corner and bolted to the adjacent walls, the corner subsequently being finished in a suitable manner. In order to form this right angular notch, an elongated forming angle 150 is provided along the full length of the lower edge of the forming surface of the board 134. This forming angle 150 includes a full length horizontal leg 152 projecting inwardly from the lowermost edge of the board 134 and a vertical leg 154 projecting vertically from the inner edge of the horizontal leg 152 and into engagement with the inner surface of the form board 134 above the lower edge thereof. As will be noted in FIGURE 10, a plurality of diagonally extending plates 156 are provided at longitudinally spaced points along the length of the angle member 150, these plates 156 being welded to the legs adjacent the outer edges thereof and being centrally braced by bracing plates 158 extending from the rear surface of the plates 156 to the angle formed by the horizontal and vertical legs 152 and 154, both the plates 156 and braces 158 being rigidly welded into position. It is through these plates 156 that the angle form 150 is fixed to the form board 134, this being achieved by a plurality of nutted bolts 160 extending through the form board 134 and centrally located apertures 162 in the plates 156. Incidently, it will be noted that the forming angle 150 is larger than the lower stiffening member 136 so as to enable the insertion of the bolts 160 through the form board 134 above the lower stiffening member 136.

Figure 11:
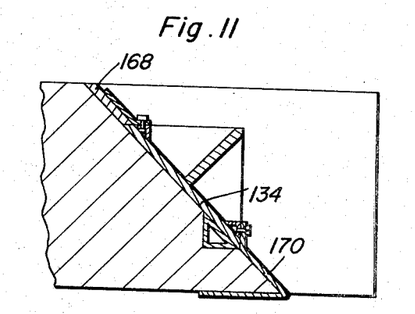
FIGURE 11 is a partial cross sectional view through the exterior side form board taken within the footing forming portion of the apparatus and illustrating the upper and lower extensions for continuing the angle of the side edge throughout the entire width of the footing.

The opposite ends of the pair of side forms 130, and more particularly the end members 142 thereon, are abutted against the inner or forming surfaces of the base and top boards 40 and 44 with the side forms being clamped therebetween by a drawing together of the base and top boards 40 and 44 through the clamping unit 48. Referring to FIGURE 8, it will be noted that the foot end of each side form 130 is received between the upper and lower shoulder forms 110 and 38. A vertically elongated clamping member 164 is then applied to the shoulder forms 38 and 110 outwardly of the side form 130 so as to draw these shoulder forms together and clamp the side form 130 therebetween, thus further stabilizing the forming apparatus. This clamping member 164 can be of any suitable type including an adjustment such as the threaded bolt 166 threaded through one leg of the clamping member 164 and engaged with the horizontal flange of the top shoulder form 110 while the other leg of the clamp is engaged under the upper horizontal leg of the lower shoulder form 38. With the lower portion of each side form 130 being secured in this manner, it will be appreciated that this side form will be stabilized in position regardless of which of the orientations, shown in FIGURES 12 and 13, is desired. In addition, in order to form the side edges of the footing portion 34 of the exterior wall, it will be noted that, referring to FIGURES 8 and 11, upper and lower extension members 168 and 170 are provided, both being releasably secured to the side form board 134 in any suitable manner such as by screws. It will be noted also that the upper extenison 168 consists of a flat plate orientated coplanar with the board 134 while the lower extension 170 consists of an acute angle member having one leg orientated coplanar with the form board 134 and the bottom leg thereof orientated horizontally so as to lie on the footing portion of the casting bed 30. In this manner, the footing portions of the adjacent walls 132 will abut each other in the same manner as the main portions of the walls thereabove.

Referring to FIGURES 3 and 9, it will be noted that the elongated vertical leg 154 of the angle form 150 is utilized in positioning the longitudinally extending reinforcing rods 172 to be embedded within the poured concrete wall. Each of the rods 172 has, welded to the adjacent end thereof, an internally threaded socket 174 which is abutted against the vertical form leg 154 in surrounding relation to an aperture 176 therein, a headed mounting bolt 178 extending through this hole 176 and being threaded within the socket 174 so as to clamp the end of the rod 172 to the leg 154 and exert some tension thereon. In the event the side form 130 is to be inverted so as to enable the formation of an interior corner, the socketed end 174 of each of the reinforcing rods 172 can be bolted directly to the form board 134 in the same manner. Further, additional sockets can be provided where needed along the side edges of the wall 132 through the utilization of reinforcing rods extending transversely through the wall directly adjacent this edge, this system being generally used when providing embedded sockets for securing together internal corners through the use of the elongated right angular corner member 148 shown in FIGURE 15.

Figure 1:
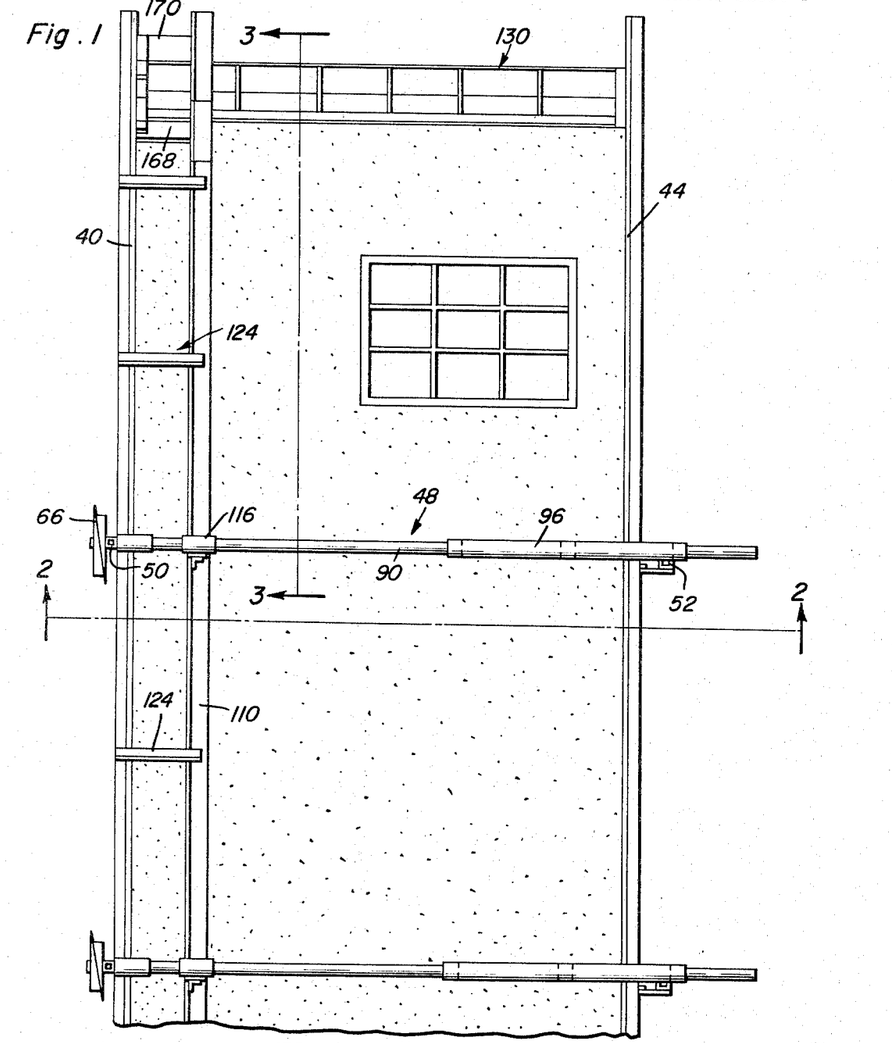
FIGURE 1 is a top plan view illustrating the forming apparatus of the instant invention in erected position during a pouring operation.
Figure 2:
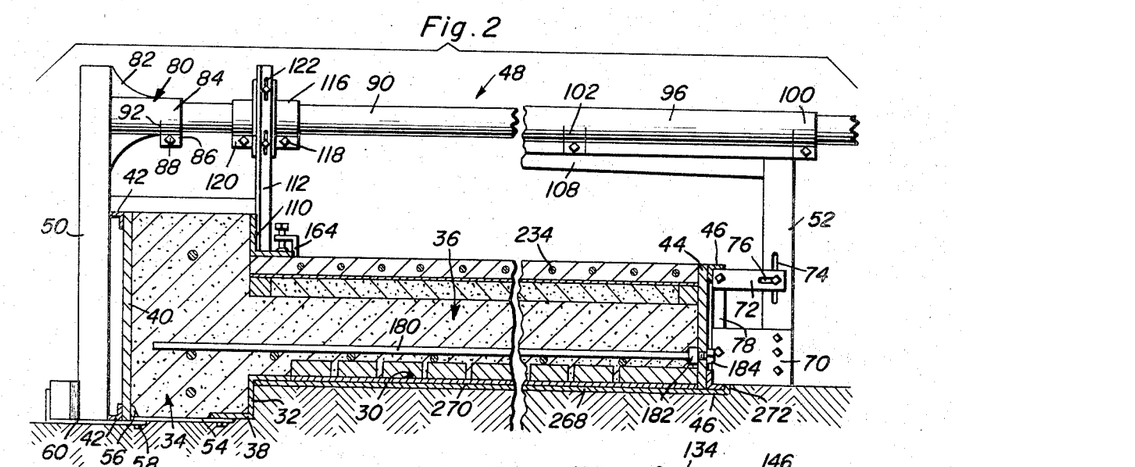
FIGURE 2 is an enlarged cross sectional view taken substantially on a plane passing along line 2—2 in FIGURE 1.

Referring to FIGURES 2 and 3, it will also be noted that transversely extending rods 180 are provided, these rods 180 being welded to the rods 172 and including, fixed to the top end thereof, internally threaded sockets 182 clamped to the top form board 44 by headed bolts 184 extending through the form board 44 and threaded within the sockets 182. These sockets 182, opening through the top of the formed wall, are deemed particularly significant in providing means to which the lifting equipment is to be attached once the wall is ready to be tilted up into position. Likewise, by so bolting the top form board 44, the clamping unit 48 can be removed in sufficient time to allow a finishing of the surface of the concrete.

Figure 4:
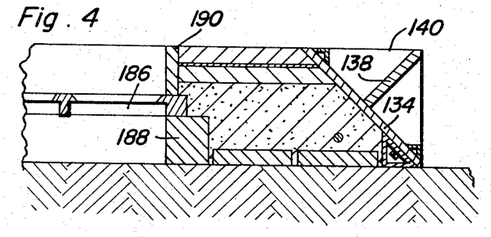
FIGURE 4 is a partial cross sectional view through an exterior wall similar to that shown in FIGURE 3 wherein the manner of locating a window is illustrated.

Referring momentarily to FIGURE 4, it will be appreciated that, through the use of the open forming apparatus of the instant invention, window or door frames 186 can be molded directly into the wall 132, these frames 186 being centered within the wall by masonry blocks or stones 188 and by tile or removable form boards 190. Likewise, various openings for door chimes, bells, telephones, etc. can be easily provided for prior to a pouring of the wall.

Referring now specifically to FIGURES 16–19, attention is directed to the fact that when forming an interior wall 192, flat vertically orientated elongated side form boards 194 are utilized, these side boards 194, as was the case with the boards 40 and 44, being braced along the exterior longitudinal edges by elongated stiffening angles 196 secured thereto. The interior side form boards 194 have their top and foot ends thereof abutted against the foot and top form boards 40 and 44, thereby effecting a clamping of the side form boards 194 therebetween in the same manner as was the case with the side forms 130 of the exterior wall. By the same token, clamping devices 164 can also be used to supplement the clamping of the boards 194. In order to form the side edge of the interior wall footing, a vertical forming panel 198 is provided between the base form board 40 and the shoulder forms 38 and 110, this panel 198 extending from the footing portion of the casting bed vertically to the top of the board 40 and shoulder form 110. As will be noted, this panel 198 is offset inwardly from the adjoining side board 194 so as to form a similar offset in the finished interior wall 192, thereby enabling an engagement of the side edge of the interior wall 192 against the interior face of an adjacent exterior wall 137. Further, the lower side edge of the interior wall is to be beveled or angled, as at 200, so as to nest within a mating notch 202 in the upper portion of the footing of the exterior wall 137, this notch 202 being formed by the incorporation of a suitable removable pan in the appropriate place when forming an exterior wall. The inclined or beveled portion 200 is to be formed by outwardly angling an intermediate portion 204 of the panel 198 between the shoulder forms 38 and 110. It will of course be appreciated that these mating or interfitting portions of the perpendicularly related interior wall 192 and exterior wall 137 can be slightly modified if desired. The stabilizing of the panel 198 relative to the adjoining side form board 194 is achieved by means of a pair of vertically spaced outwardly projecting plates 206 rigidly fixed, as by welding, to the outer face of the panel 198 and extending therefrom both over and under the board 194 and a distance therebeyond capable of receiving vertically extending clamping bolts 208 therethrough for effecting a slight flexing together of the plates 206 so as to produce a clamping of the interior side form board 194 therebetween. In addition, each of the plates 206 may be provided with an interior guiding angle 210 for insuring a proper positioning of the side board 194, the stiffening angles 196 of the board 194 abutting against the guide angles 210 fixed to the interior of the plates 206. This structure is of course adjustable as a unit so as to lengthen or shorten the wall being formed.

Figure 20:
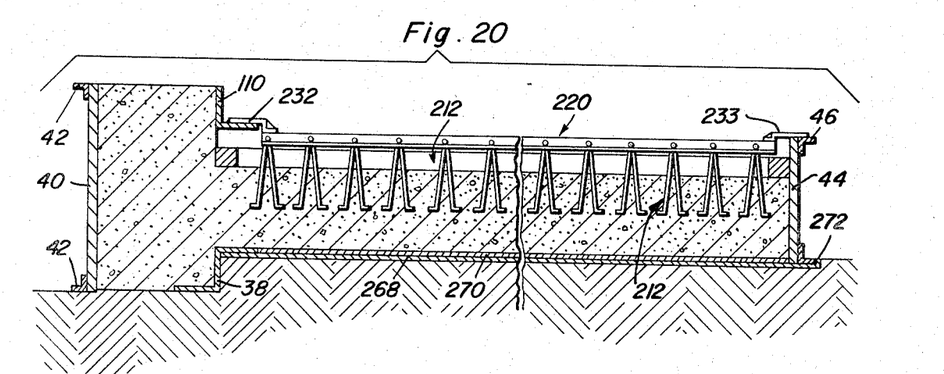
FIGURE 20 is a transverse cross sectional view through the forming apparatus illustrating the stirrup supporting and positioning member with the stirrups suspended therefrom.
Figure 21:
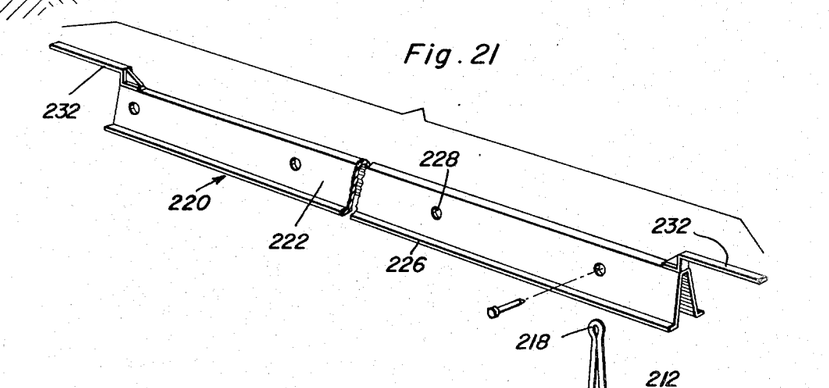
FIGURE 21 is an exploded perspective view of the stirrup supporting member, the removable locating pin and one of the stirrups.
Figure 22:
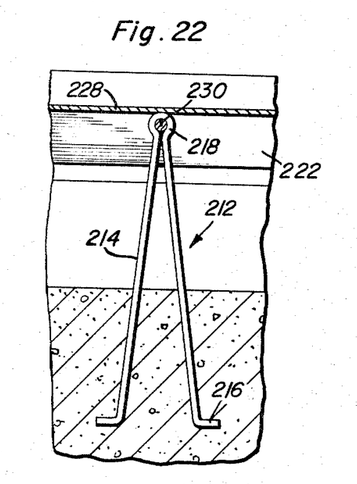
FIGURE 22 is a cross sectional detail illustrating the manner in which a stirrup is to be suspended.
Figure 23:
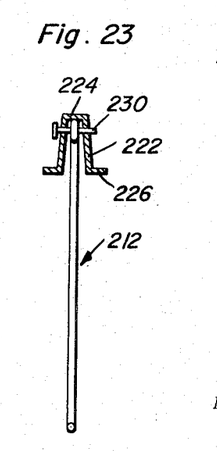
FIGURE 23 is a transverse cross sectional view through the device further detailing the manner in which a stirrup is to be supported therein.

Referring now specifically to FIGURES 20–23, it should be noted that the forming apparatus of the instant invention is to also incorporate a device utilized in the supporting and positioning of wire locating stirrups 212, these stirrups preferably including a pair of diverging legs 214 terminating, at the base end, in laterally directed feet 216, and at the apex end in an integral bulbous or circular portion 218. The supporting or positioning device 220, generally of a length so as to transversely span the apparatus between the outer shoulder form 110 and the top form board 44, includes a pair of full length side panels or walls 222 interconnected along their top edges by a horizontally extending flate bight portion 224 and terminating, at their lower edges, in laterally directed rigidifying flanges 226. The side walls 222 are provided with longitudinally spaced pairs of holes 228 therethrough, each pair of holes forming a passage completely through the device 220 and being located in a manner which enables an alignment of the circular portion 218 of a stirrup 212 therebetween, as best seen in FIGURE 23, for the reception of a nail or pin 230 therethrough. In this manner, it will be appreciated that the stirrups 212 can be freely suspended below the horizontally orientated support 220 with the support 220 being released from the stirrups 212 by merely removing the pins 230. In order to mount the supporting device 220, an upwardly offset bar 232 is fixed to the bight portion 224 adjacent each end thereof and projects laterally therebeyond, one bar 232 resting on the horizontal leg of the outer shoulder form 110 and the other bar 232 resting on the upper edge of the top form 44 as illustrated in FIGURE 20. In use, the individual stirrups 212, used to support the rods or mesh 234 within the interior portion of the exterior wall, these rods being seen in FIGURE 2, are individually suspended, through the pins 230, from a plurality of devices 220 with these devices 220 then being positioned transversely across the form prior to a pouring of the exterior portion of the exterior wall. After the pouring of the exterior portion and an initial setting thereof, the various devices 220 can be removed by merely removing the pins 230 and the remainder of the wall poured, after of course mounting the wires or mesh 234 within the stirrups 212. Incidently, through the use of a series of duplicate devices 220, it will be appreciated that a proper alignment of these stirrups throughout the full length of the wall will be assured. It should also be appreciated that the stirrups, utilizing the supporting device 220, can be inserted into the initial concrete pour imediately subsequent thereto and before a setting thereof, the support device 220 insuring a proper locating of the stirrups 212 and a proper supporting thereof until the concrete has set sufficiently so as to retain the stirrups 212.

Figure 24:
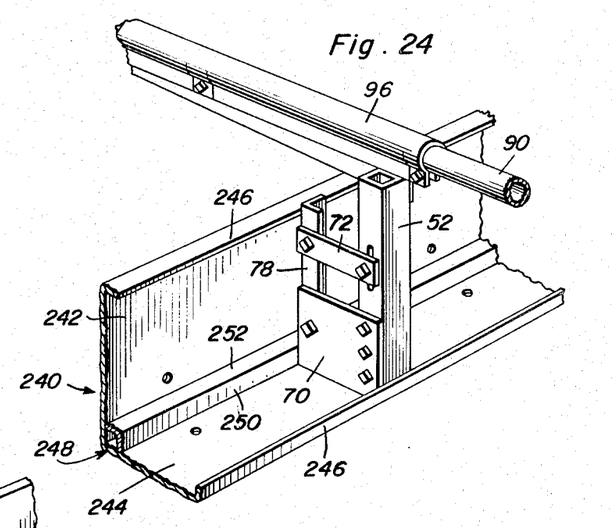
FIGURE 24 is a perspective view similar to FIGURE 5 illustrating a modified top form board.

While the above detailed description sets forth the specific structural details of the various form apparatus elements, it will of course be appreciated that modifications of these various elements, within the scope of the invention, is contemplated. For example, FIGURE 24 illustrates a top form board 240 which can be used as an alternative to the top form board 44. The form board 240 consists in effect of a metal angle having an eight inch leg or forming surface 242 and a six inch leg or forming surface 244, both having a perpendicularly directed full length stiffening flange 246 along the outer edges thereof. Additional rigidity is introduced into the angle top form board 240 by the centrally extending bracing angle 248 which presents a bearing face 250 coplanar with the edge of one flange 246 and a bearing face 252 coplanar with the edge of the other perpendicular flange 246, the top arm 52 bearing against one of the faces 250 or 252 and the corresponding flange edge through the plate 70 and strap 72 and the vertical angle 78 mounted thereon. It will of course be appreciated that by making the forming legs 242 and 244 of different widths, the same form board 240 can be utilized in the pouring of either of two different thickness walls by merely reversing the angled form board 240. This board 240, as was the board 44, is also provided with bolt holes so as to enable the anchoring of the adjoining ends of the reinforcing rods 180.

Figures 25, 27:
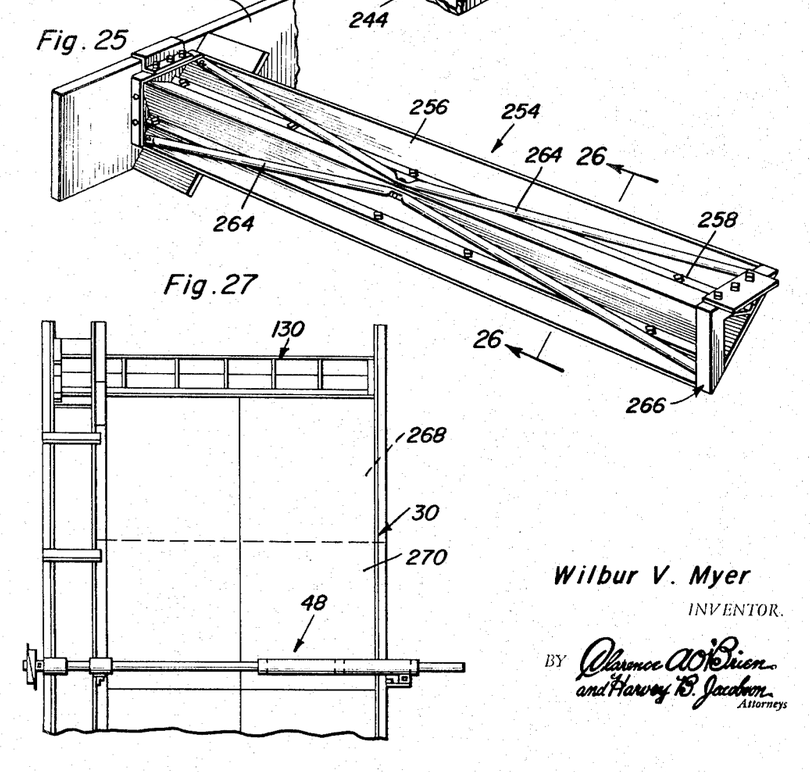
FIGURE 25 is a perspective view somewhat similar to FIGURE 8 illustrating a modified form of side form boards.
FIGURE 27 is a partial top plan view illustrating the layout of the sheet metal plates which form the self-aligning casting bed.
Figure 26:
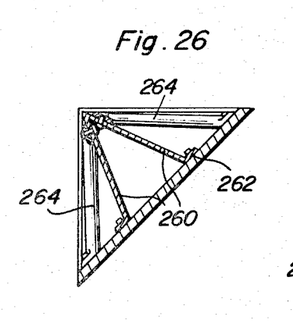
FIGURE 26 is an enlarged cross sectional view taken substantially on a plane passing along line 26—26 in FIGURE 25.

FIGURES 25 and 26 illustrate a modified side form 254 which, like the side form 130, includes an elongated form board 256 orientated at a 45° angle and suitably rigidified. The rigidifying of the side form 254 is achieved by the provision of a full length angular back rib 258 having diverging full length legs 260 terminating in laterally directed feet 262 which are in turn bolted to the board 256, this in turn is effect dividing the form board 256 into three longitudinal sections, thereby providing a means for effectively resisting any tendency for the board 256 to twist notwithstanding the length thereof. Further rigidity is achieved through the provision of elongated rigid rods 264 from a midpoint adjacent the top edge of each leg 260 outwardly to the extreme corners of the board 256. In this manner, a light weight though extremely rigid side form 254 is provided. Incidently, it will be noted that end members 266, similar to the end members 142, are also provided. While not specifically illustrated, the instant invention also contemplates utilizing the angular back rib or brace 258, in conjunction with the cross braces 140 and upper and lower angle stiffeners 136, as a replacement for the back rib or bracing plate 138 of the side form 130 as for example illustrated in FIGURE 8. In order to stabilize the side form 254 relative to the base and top form boards, the base end thereof has a Z-shaped bracket bolted thereto while the top end has a laterally projecting plate bolted thereto, both the bracket and plate overlying the adjacent boards.

FIGURE 27 illustrates the preferred layout of the steel sheets utilized in the formation of the casting floor 30. These metal sheets are arranged in two layers 268 and 270 with the lower layer 268 having the sheets therein extending transversely across the wall from the footing offset 32 to the top form board. The sheets or plates in the upper layer 270 are layed at right angles to the sheets in the lower layer 268 and extend longitudinally along the length of the casting bed between the offset 32 and the top form board. In this manner, any weakness along the abutting edges of the plates is eliminated. Further, any waves, wrinkles or leakage which might be expected to develop if only one layer of metal sheets is used is avoided. The use of sheet steel is particularly desirable in that such sheets will produce a perfectly smooth wall finish, thereby eliminating the need for any expensive hand plastering. Also, inasmuch as such sheets, due to modern technology, are formed with extreme accuracy, the sheets themselves can be utilized in laying out the form boards and squaring the corners, thereby requiring only the initial defining of one edge for the laying of one of the casting bed sheets, the remaining sheets, upon being aligned with the first sheet, providing straight lines and true corners.

With particular reference to FIGURES 2 and 20, it will be noted that the sheets of the lower layer 268 have the end thereof at the top form board 44 upwardly turned or flanged as at 272. This flange 272 forms a small lip against which the top form board can be engaged, assuming the formation of a wall of conventional height, this lip also acting so as to additionally stabilize the top form board and eliminate the necessity of providing any ground stakes. The sheets of the lower layer 268 will normally underlie both the upper horizontal leg of the lower shoulder pan 38 and the top form board 44, while the sheets of the upper layer 270 will abut the inner edge of the lower shoulder pan and the inner face of the top form board 44 adjacent the lower edge thereof, in the illustrated arrangement, thereby further facilitating the alignment of the various elements.

From the foregoing it should be appreciated that a highly unique forming apparatus has been defined, this forming apparatus being equally adaptable to form both interior and exterior walls integrally with the enlarged footings. In this manner, the necessity of individually constructing the wall on an independently formed footing is avoided, along with the time delay incident thereto and the necessity for effecting a positive tying of the wall to the footing. Through the use of the unique forming apparatus of the instant invention, the wall and footing is formed as a single unit ready, upon a hardening thereof, to be tilted up into its vertical position for use in conjunction with additional walls having complementarily formed vertical edges. The forming apparatus of the instant invention, in addition to including various means for clamping the peripheral form boards in position and properly locating these form boards for the forming of the edges, does so in a manner which leaves the casting bed substantially clear so as to enable a proper working of the concrete. Further, the forming apparatus, in addition to being substantially completely disassemblable for storage and transportation purposes, is completely salvageable after each forming operation for use in the subsequent formation of additional walls. In conjunction with this, the instant invention contemplates facing the forming surfaces with plastic for preserving these faces and avoiding the necessity of oiling them.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Forming apparatus for forming poured walls comprising a generally horizontal casting table, a top form board, a foot form board generally parallel and in laterally spaced relation to the top board, a pair of generally parallel spaced side form boards extending between the top and foot boards adjacent the opposite ends thereof, a plurality of elongated clamping units extending over and transversely across the top and foot boards, means operatively connecting each end of each clamping unit with the adjacent board, said clamping units being longitudinally extensible and retractable, said foot board being of a greater height than the top board and orientated so as to project both above and below the planes of the upper and lower edges of the top board, an elongated shoulder form orientated inward of and generally parallel to the foot board, means suspending said shoulder form from the clamping units, said shoulder form having its upper edge generally coplanar with the upper edge of the foot board and its lower edge generally coplanar with the upper edge of the top board, and an elongated shoulder forming offset in the casting table generally parallel to and below the shoulder form, said offset being equal in height to the projection of the foot board below the plane of the lower edge of the top board, said offset dividing the casting table into a first level extending between the offset and foot board and generally coplanar with the lower edge of the foot board, and a second level extending between the offset and the top board and generally coplanar with the lower edge of the top board.

2. The apparatus of claim 1 wherein each clamping unit includes a base arm positioned against the outer face of the foot board, a top arm positioned against the outer face of the top board, a rod rigid with one arm adjacent the upper end thereof and projecting perpendicularly therefrom toward the other arm, said other arm having a sleeve rigid therewith and projecting perpendicularly therefrom toward the one arm, said rod being telescopically received within said sleeve, and means locking said rod in said sleeve in a plurality of telescopically adjusted positions.

3. The apparatus of claim 2 wherein the means locking the rod in the sleeve on each clamping unit includes a plurality of longitudinally slotted portions on the sleeve, each slotted portion including a pair of space longitudinal edges defining the slot, slits extending from at least one end of each edge partially about the circumference of the sleeve to allow an inward flexing of the portions through a drawing of the edges toward each other, and means for drawing the edges toward each other and reducing the diameter of the sleeve portions.

4. The apparatus of claim 2 including a second elongated shoulder form overlying the casting table offset, a plurality of rigid bars fixed to said second shoulder form and projecting transversely to the foot form board, each of these bars including a rigid stop projecting upwardly from the outer end thereof, the lower edge of the foot board being engaged against said stops.

5. The apparatus of claim 4 including an extension associated with each bar, quick release means engaging one end of each extension with the corresponding bar so as to enable a projection of the extension longitudinally from the bar and beyond the foot board, the outer end of each extension terminating in a vertical flange, a clamping unit being located in the general vertical plane of each aligned bar and extension, the means operatively connecting the base arm end of each clamping unit to the foot board including wedge means engaged between each flange and the lower portion of the base arm of the corresponding clamping unit for clamping the lower edge of the foot board against the adjacent stop.

6. The apparatus of claim 2 wherein said means suspending the shoulder form includes a sleeve section slidably mounted on each clamping unit rod, means for locking said sleeve section at any of a plurality of slidably adjusted positions along the rod, a rigid vertical member rigid with the shoulder form and projecting thereabove adjacent the sleeve section, and means for securing the rigid member to the sleeve section in any of a plurality of vertically adjusted positions.

7. The apparatus of claim 1 including a second elongated shoulder form overlying the casting table offset, each side form board being of substantially the same vertical height as the top board, one end of each side board extending through the two shoulder forms and into abutting engagement with the foot form board, and means for drawing the shoulder forms toward each other for clamping the side boards therebetween.

8. The apparatus of claim 7 including means engaged with each side form between the shoulder forms and the foot board and projecting both up to the horizontal plane of the top edge of the foot board and down to the lower level of the casting table.

9. The apparatus of claim 8 wherein said last-mentioned means consists of a vertically orientated panel offset inwardly from the portion of each side board between the shoulder forms and foot board, each panel including a pair of outwardly projecting plates, one of these plates overlying the adjoining side board and the other plate underlying the adjoining side board, and means for drawing the plates together for clamping the adjoining side board therebetween.

10. The apparatus of claim 7 wherein each side board is orientated at approximately a 45 degree angle to the vertical, a longitudinally extending brace fixed to the longitudinal centerline of the outer surface of each side board and projecting perpendicularly therefrom to approximately the meeting line of an outward projection of the horizontal and vertical planes of the upper and lower edges of the board, and transversely extending braces fixed to the outer surface of the side board at longitudinally spaced points therealong.

11. The apparatus of claim 10 including an elongated vertically orientated member fixed to the inner surface of each side board parallel to and inward of one edge thereof, said member projecting to the horizontal plane of the corresponding edge so as to define an angular space between the member and the adjoining portion of the side board.

12. The apparatus of claim 11 including longitudinally spaced bolt receiving apertures through the elongated vertically orientated member, and a pair of extension plates fixed to the upper and lower edges of the portion of each side form located between the shoulder forms and the foot board, said extension plates projecting to the horizontal planes of the upper and lower edges of the foot board.

13. The apparatus of claim 1 including a stirrup supporting and positioning device, said device comprising an elongated support bar extending transversely across the casting table and supported at one end on the elongated shoulder form and at the other end on the top edge of the top board, said bar including a pair of laterally spaced elongated generally parallel vertically orientated walls, pairs of laterally aligned holes through said walls at longitudinally spaced points along said bar, and an elongated pin releasably insertable through each pair of openings for the suspension of stirrups engaged with that portion of each pin located between the walls.

14. Forming apparatus for forming poured concrete walls including a first pair of parallel elongated vertically orientated and transversely spaced form boards, a clamping unit extending transversely across and beyond said form boards, said clamping unit including a first vertical arm positioned against the outer face of a first one of said boards, a second arm positioned against the outer face of the second one of said boards, a rod rigid with the first arm adjacent the upper end thereof and projecting perpendicularly therefrom toward the other arm, said other arm having a sleeve rigid therewith and projecting perpendicularly therefrom toward the first arm, said rod being telescopically received within said sleeve, means for locking said rod in said sleeve in a plurality of telescopically adjusted positions, a sleeve section slidably mounted on said rod, means for locking said sleeve section at any of a plurality of slidably adjusted positions along said rod, a rigid vertically orientated member, means for securing the rigid member to the sleeve section in any of a plurality of vertically adjusted positions, and an elongated angular forming bar fixed to the lower end of the vertical member, said forming bar being orientated parallel to the form boards for use in conjunction therewith in the formation of a vertical offset in the poured wall.

15. The apparatus of claim 14 including a second elongated offset forming bar located below the first-mentioned bar and extending generally parallel thereto, a strap fixed to the second of said bars and extending transversely therefrom to one of the form boards, a vertical abutment on the outer end of said strap, the lower edge of the adjoining form board being engaged against said stop, a removable extension secured to the outer end of the strap and projecting laterally beyond the adjoining form board, the vertical clamp arm associated with this board being orientated substantially in the vertical plane of the strap and extension, and means engaged between the extension and lower portion of this arm for forcing the arm against the adjacent form board and the form board into clamped engagement with the stop.

16. The apparatus of claim 15 including a pair of side form boards engaged, in laterally spaced relation to each other, between the first-mentioned pair of form boards, one end of each side board extending through the two offset forming bars, and means for drawing the offset forming bars toward each other for clamping the side boards therebetween.

17. The apparatus of claim 16 wherein each side board is orientated at approximately a 45 degree angle to the vertical, bracing means fixed both transversely and longitudinally to the outer surface of each side board, an elongated vertically orientated member fixed to the inner surface of each side board parallel to and inward of one edge thereof, said last-mentioned member projecting to the horizontal plane of the corresponding edge so as to define an angular space between this member and the adjoining portion of the side board.

18. The apparatus of claim 16 including a vertically orientated panel offset inwardly from the portion of each side board received between the offset forming bars and the adjoining form board, each panel including a pair of outwardly projecting plates, one of these plates overlying the adjoining side board and the other plate underlying the adjoining side board, and means for drawing the plates together for clamping the adjoining side board therebetween.

19. For use in conjunction with form boards utilized in the formation of poured concrete walls, a clamping unit, said clamping unit including a first vertical arm, a second arm positioned laterally from the first arm and in a plane parallel thereto, a rod rigid with the first arm adjacent the upper end thereof and projecting perpendicularly therefrom toward the second arm, said second arm having a sleeve rigid therewith and projecting perpendicularly therefrom toward the first arm, said rod being rotatably and telescopically received within said sleeve, means for locking said rod in said sleeve in a plurality of rotatably and telescopically adjusted positions, a sleeve section slidably mounted on said rod, means for locking said sleeve section at any of a plurality of slidably adjusted positions along said rod, a rigid vertically orientated member secured to said sleeve section, and an elongated forming bar fixed to the lower end of the vertical member and orientated transversely thereacross.

References Cited

UNITED STATES PATENTS

| | | | |
|---|---|---|---|
| 995,048 | 6/1911 | Wdyong | 249—8 |
| 1,169,834 | 2/1916 | Kane. | |
| 1,538,815 | 5/1925 | Hunter | 25—1 |
| 1,643,578 | 9/1927 | Eaton et al. | |
| 1,694,292 | 12/1928 | Tracey | 249—27 |
| 1,696,700 | 3/1938 | Suiter | 249—27 |
| 2,111,577 | 11/1939 | Thomas | 249—13 |
| 2,180,842 | 4/1941 | Winding | 249—8 |
| 2,237,997 | 10/1941 | Moccia | 249—2 |
| 2,260,447 | 7/1949 | Forbes | 249—8 |
| 2,477,320 | 2/1952 | Tyroler | 25—1 |
| 2,586,413 | 2/1952 | Antonello | 249—13 |
| 3,050,283 | 8/1962 | Tumey | 25—118 |
| 3,228,679 | 1/1966 | Dees | 249—3 |

WILLIAM J. STEPHENSON, *Primary Examiner.*